No. 760,897. Patented May 24, 1904.

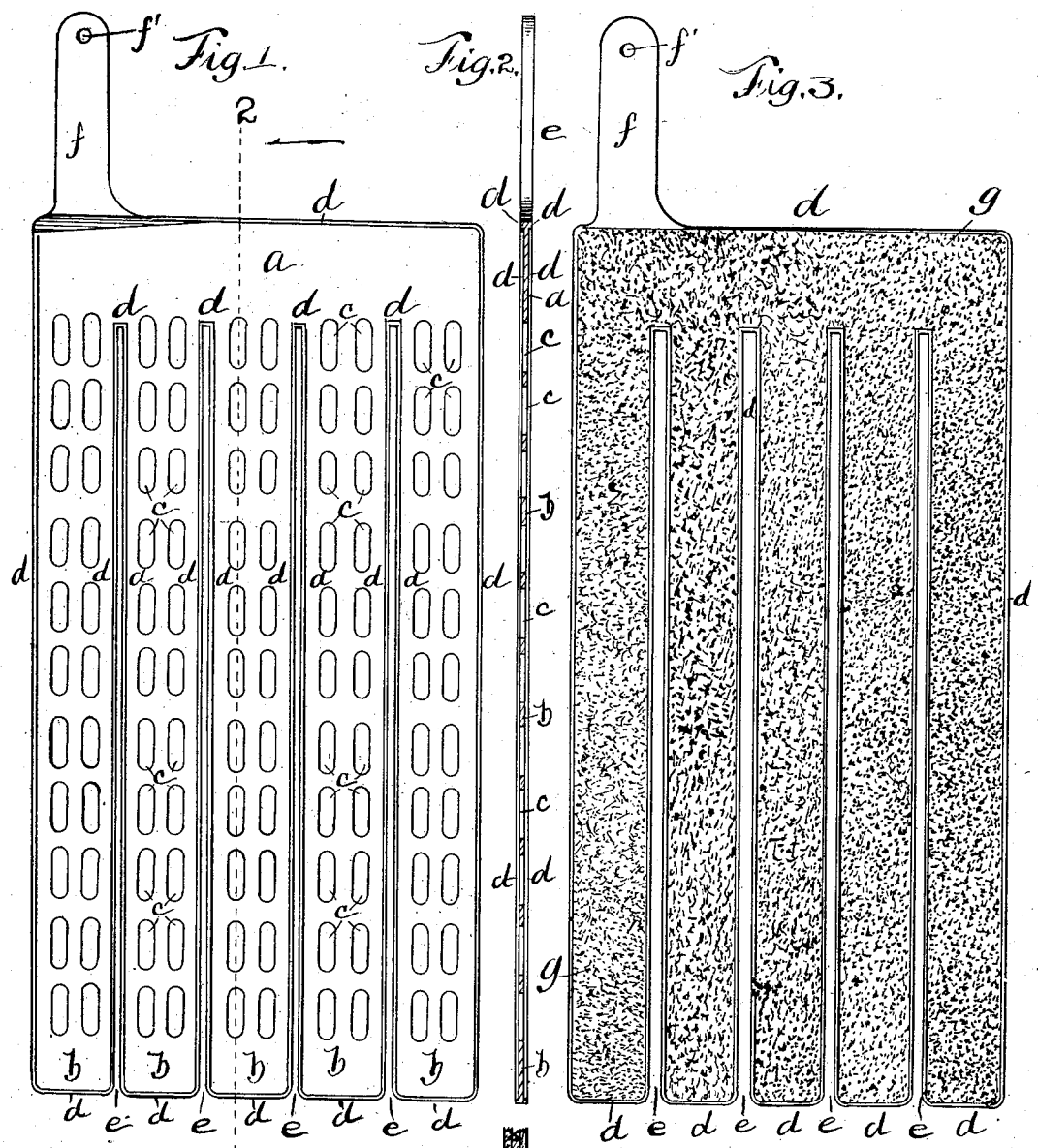

UNITED STATES PATENT OFFICE.

ACHILLE MEYGRET, OF PARIS, FRANCE, ASSIGNOR TO EDWARD T. MAGOFFIN, OF NEW YORK, N. Y.

STORAGE-BATTERY PLATE.

SPECIFICATION forming part of Letters Patent No. 760,897, dated May 24, 1904.

Application filed June 29, 1903. Serial No. 163,638. (No model.)

*To all whom it may concern:*

Be it known that I, ACHILLE MEYGRET, a citizen of the Republic of France, residing at Paris, in the Department of the Seine, France, have invented certain new and useful Improvements in Storage-Battery Plates and Protective Envelops Therefor, of which the following is a specification.

It is well known that when a storage battery has completed its cycle of work—that is to say, when it has been charged and discharged—all of the elements which enter into its formation have returned to their original state and are in a condition to be again charged and discharged, which operations continue indefinitely until the plates become worn out or deteriorated to an extent where they are not capable of performing their functions. It is also well known that under the repeated action of charging and discharging a storage battery the active matter or material of the plate dilates and contracts, and by reason of the fact that the elasticity of the active matter or material is very limited the dilation and contraction thereof loosens the same and the loosened active matter or material drops away from the body of the plate, rendering the battery in a comparatively short period of time useless and inoperative.

Efforts have been made in various ways to retain the active matter or material on the plates or grids, one way being to increase the thickness of the plates or grids as a whole, so as to furnish a greater thickness of active matter or material, requiring a longer period of time to loosen and drop the mass of active matter or material to an extent where the plate or grid becomes useless and inoperative. This increase of thickness of plate has not proven satisfactory because of the well-settled fact that the greatest efficiency is obtained with a minimum thickness of plate and a maximum surface exposed, and, furthermore, the thick plates are objectionable as being too heavy and of too great size for certain purposes and uses—as, for instance, for locomotion.

One object of this invention is to construct a storage-battery plate or grid which will be thin and light, thus diminishing the dead-weight without militating against the necessary rigidity and solidity of the plate or grid as a whole and which will be capable of use without readily bending or buckling or being easily broken.

A further object is to increase the active surface, using a light thin plate. A still further object is to protect the active matter or material against the effects of charging and discharging the battery as regards the loosening and dropping off of the active matter or material and to improve generally the construction, formation, and arrangement of the plate and the affixing and retaining of the active matter or material thereon.

The invention consists in the features of construction and combinations of parts hereinafter described and claimed.

In the drawings, Figure 1 is a side elevation of one of the plates or grids of the invention without the active matter or material; Fig. 2, a sectional elevation on line 2 of Fig. 1 looking in the direction of the arrow; Fig. 3, a side sectional elevation of the plate complete with the active matter or material thereon, and Fig. 4 a detail in sectional elevation of a complete plate.

The plate or grid shown is of rectangular form and is preferably made of sheet metal cast, stamped, or otherwise shaped into form. The form shown has an upper end piece $a$, formed solid the entire width of the plate or grid and of sufficient depth to furnish a support for the strips or bars $b$, the end piece and the strips or bars constituting the plate or grid proper as a whole. The end piece and the strips or bars have their outer side surfaces or faces in the same plane, and each strip or bar has therein a series of openings or perforations $c$, which form or furnish passageways between the two opposite faces of each strip or bar for the passage of the active matter or material therethrough when spread on the faces of the strip or bar, forming a neck or web by which the active matter or material will be held firmly on the faces of each strip or bar, preventing displacement of the active matter or material readily and increasing the efficiency of the plate or grid as a whole in this respect, as well as serving to decrease the dead-weight of the plate.

The end piece *a* and the strips or bars *b*, forming the body of the plate, being made of thin material, preferably, in order to strengthen the plate as a whole a border ridge or rib *d* is formed around the outer edge of the end piece and the two outside strips or bars and extends around the end of each strip or bar and along the sides thereof. This stiffening ridge or rib adds greatly to the rigidity of the plate as a whole when made of thin material and in addition forms channels or depressions for the opposite faces of the end piece *a* and strips or bars *b*, in which channel or depression the active matter or material is spread on both sides of the plate and held in place against side and end displacement by the ridges or ribs.

The strips or bars, while constituting, in effect, an entirety, are in reality separate and distinct one from the other by reason of a slot *e*, extending from the lower edge of the end piece *a* the full length of the strips or bars, separating the vertical or longitudinal edges of the strips or bars one from the other. This division of the strips or bars, while not affecting the solidity of the plate as a whole, tends to reduce the weight to a minimum and furnish a large superficial area of plate for use and in addition, by reason of having the strips or bars separated one from the other by a clean division, the tendency to bend and buckle is largely overcome, as the bending or buckling of one strip or bar would not affect the adjoining strip or bar so far as concerns bending or buckling. The slot *e* between the vertical or longitudinal edges of the several strips or bars should be of sufficient width to subdivide the area of active material into divisions each separate and distinct from the other, so that in the use of the plate the expansion or contraction of the active material on one strip or bar will not transmit its effects to the companion strip or bar in loosening the active matter or material on the strips or bars. It will also be seen that the expansion and contraction of the active material only extends over the dimensions of each strip or bar, reducing the expansion and contraction of the active material to a minimum as compared to a plate or grid in which the body was continuous or in one piece, and this minimum of expansion and contraction of the active material also prevents the effects of expansion and contraction in loosening the active matter or material.

The end piece or section *a* of the plate or grid has extending up therefrom an arm or conductor *f* for the attachment of the plate, as usual in connecting the plates of a storage battery or accumulator. The opposite faces of the end section *a* and the strips or bars *b* are covered or coated with active material *g* of any usual and well-known composition, which material lies within the channel or depression between the projecting ribs *d* and extends through the openings *c*, by which ribs and openings the active matter or material is securely attached to the faces of the plate or grid, furnishing a surface of large superficial area of active matter or material for the operation of the plates, it being well known that accumulators or storage batteries operate more particularly on the surface of their plates than otherwise.

The advantages of the plate or grid of the present invention are: The construction is one which enables a series or multiplicity of small plates to form a complete whole and be cast as one piece. A large acting surface is provided, and this in connection with a plate or grid of the least possible thickness. The dead-weight is diminished while increasing the surface, and this without departing from the rigidity and solidity as a whole. The active matter or material is retained on the plate and held in place against displacement in an effective and reliable manner. The bending or buckling of the plate or grid is overcome to an extent that will obviate the danger of breaking the active matter or material. The effects of expansion and contraction are confined to a limited surface, thus preventing contraction and expansion from loosening the entire body of the active matter or material, as the effects of expansion and contraction can only affect that portion of the active matter or material held in place on each separate strip or bar, and the end piece or section *a* furnishes a support for the strips or bars and the conductive means for the current, all of which are features of utility that add to the life and effectiveness of the plate or grid for general and special use. It will be understood, of course, that the plate or grid is adapted for use for both the positive and the negative plates of an accumulator or storage battery.

The plate of the present invention, while it prevents to a large extent the loosening of the active matter or material *g*, is not a perfect safeguard against such loosening, and in order to more effectually overcome the effects of loosening and continual dropping of the active matter or material the matter or material should be held in place by a protecting coating or sheath. The protective covering or sheath should be elastic and of a nature not attackable by the electrolyte and should also have the requisite binding quality that will prevent the active matter or material from detaching itself and dropping or falling off from the plate or grid. Such a protective covering or sheath is obtained by dipping the plate or grid, after applying the active matter or material *g* thereto, in a bath or solution consisting of castor-oil, essence of turpentine, octonitric cellulose, and ordinary nitrate of cellulose of commerce, the tetranitrate of cellulose being preferred. This bath or solution, when the plate or grid is dipped thereinto, forms a close-fitting coating or sheath $h$, (shown in Fig. 4,) which draws and presses the active matter or material firmly against the supporting surfaces or faces of the grid or plate and positively and effectively prevents the detaching, falling off, or dropping off from the plate or grid of the matter or material. This envelop or sheath formed of the ingredients named in proper portions is of an elastic nature and will not be attacked by the electrolyte, preventing the electrolyte from coming in direct contact with the metal of the plate or grid, by which the life of the plate or grid is prolonged; but in order to allow the electrolyte to reach the active material the envelop or sheathing should be rendered porous or given porosity, either by mechanical means or chemically, that will not destroy the envelop or sheath as a protector in keeping the active matter or material on the plate in case of loosening and yet allow of the requisite access to the active matter or material for charging and discharging purposes. This envelop or sheath, while shown in connection with a plate or grid having an end section and a plurality of strips or bars, is not confined in its use to the form of plate shown, as it is adapted for use and can be used as a porous protective envelop for every form or style of storage-battery plates or electrodes. This porous protective envelop or sheath will enable the storage-battery plate or electrode to be made as large as may be demanded or required for commercial purposes, as it serves to retain the active matter or material on the plate or grid in case of becoming loose, and, furthermore, by using the porous protective envelop or sheath the plate or grid can be made very thin, and consequently very light, and storage-battery plates or electrodes thus protected by a porous envelop or sheath will be conserved or kept in working condition for a long period of time and will greatly increase the capacity of the plate as to charging and discharging, thus making a saving in this respect.

What I regard as new, and desire to secure by Letters Patent, is—

1. A grid for a storage-battery plate, consisting of an end piece and a plurality of strips or bars united with the end piece and definitely separated one from the other a small distance apart, each strip or bar having on each outer face a receiving-surface for the active material, the receiving-surfaces running parallel with the outer side faces of the end piece of the plate, substantially as described.

2. A grid for a storage-battery plate, consisting of an end piece and a plurality of strips or bars united with the end piece, each strip or bar having on each outer face a receiving-surface for the active material, and each strip or bar having through its body openings or perforations, and the several strips or bars definitely separated one from the other a small distance apart with the receiving-faces for the active material of the strips or bars in the same plane with the outer faces of the end piece of the plate, substantially as described.

3. A grid for a storage-battery plate, consisting of an end piece and a plurality of strips or bars united with the end piece and definitely separated one from the other a small distance apart, and the end piece and the several strips or bars having an edge or rim projecting on both sides and forming channels or depressions for the reception of the active material, substantially as described.

4. A grid for a storage-battery plate, consisting of an end piece and a plurality of strips or bars united with the end piece, each strip or bar having on each outer face a receiving-surface for the active material, the receiving-surfaces lying in the plane of the outer side faces of the end section of the plate, each strip or bar having through its body openings or perforations, the several strips or bars definitely separated one from the other a small distance apart, and the end piece and the several strips or bars having an edge ridge or rib projecting on both sides and forming channels or depressions for the reception of the active material, substantially as described.

5. The combination in a plate for a storage battery, of a grid having an end piece and strips or bars united with the end piece, each strip or bar having outer faces furnishing receiving-surfaces for the active material, with the receiving-surfaces in the same plane with the plane of the outer side faces of the end piece of the plate, and with the strips or bars definitely separated a small distance apart, a coating of active material applied to the outer side faces of the end piece and to the receiving-surfaces of the outer side faces of the strips or bars, and a sheath of protective material covering the plate as a whole, said sheath consisting of castor-oil, essence of turpentine, octonitric cellulose and nitrate of cellulose, substantially as described.

6. A grid for a storage-battery plate, made of thin material and consisting of an end piece, at the top of the plate, and a plurality of strips or bars depending from the end plate and standing in edgewise relation to each other and having their edges, as to adjacent strips or bars, definitely separated one from the other, each strip or bar having a receiving-surface for active material on each outer side face thereof, the outer side faces of the end piece and the outer side faces of the strips or bars being in the same plane and receiving the active material thereon in a line parallel with the outer side faces, substantially as described.

7. A grid for a storage-battery plate, made of thin material and consisting of an end piece, at the top of the plate, and a plurality of strips or bars standing in edgewise relation to each other and having the edges of adjacent strips or bars definitely separated one from the other, and having on each side face of the end piece and of each strip or bar, an edge rib forming between the ribs on the outer side faces of the end piece and the strips or bars, receiving-surfaces for the active material, substantially as described.

ACHILLE MEYGRET.

Witnesses:
A. W. CHATFIELD,
CHAS. H. WHITING.